United States Patent
Dice et al.

(10) Patent No.: US 8,375,175 B2
(45) Date of Patent: Feb. 12, 2013

(54) FAST AND EFFICIENT REACQUISITION OF LOCKS FOR TRANSACTIONAL MEMORY SYSTEMS

(75) Inventors: David Dice, Foxboro, MA (US); Nir N. Shavit, Cambridge, MA (US); Virendra J. Marathe, Florence, MA (US)

(73) Assignee: Oracle America, Inc., Redwood City, CA (US)

( * ) Notice: Subject to any disclaimer, the term of this patent is extended or adjusted under 35 U.S.C. 154(b) by 514 days.

(21) Appl. No.: 12/634,640

(22) Filed: Dec. 9, 2009

(65) Prior Publication Data

US 2011/0138135 A1 Jun. 9, 2011

(51) Int. Cl.
*G06F 12/00* (2006.01)

(52) U.S. Cl. .................... 711/152; 711/163

(58) Field of Classification Search .................. 711/152, 711/163
See application file for complete search history.

(56) References Cited

U.S. PATENT DOCUMENTS

| | | | | |
|---|---|---|---|---|
| 6,029,190 | A * | 2/2000 | Oliver | 718/107 |
| 6,058,460 | A * | 5/2000 | Nakhimovsky | 711/153 |
| 6,735,760 | B1 | 5/2004 | Dice | |
| 7,519,967 | B1 | 4/2009 | Russell | |
| 7,669,015 | B2 | 2/2010 | Dice et al. | |
| 2007/0011671 | A1* | 1/2007 | Kahlon et al. | 717/170 |
| 2007/0088928 | A1* | 4/2007 | Thangaraj et al. | 711/163 |
| 2007/0282838 | A1* | 12/2007 | Shavit et al. | 707/8 |
| 2009/0235254 | A1* | 9/2009 | Michael | 718/101 |
| 2010/0023706 | A1* | 1/2010 | Christie et al. | 711/150 |

OTHER PUBLICATIONS

Nehir Sonmez, et al. Taking the Heat off Transactions: Dynamic Selection of Pessimistic Concurrency Control, IPDPS 2009.
Mihai Burcea, et al., "The Potential for Variable-Granularity Access Tracking for Optimistic Parallelism," MSPC '08, Mar. 2, 2008, ACM.
Kiyokuni Kawachiya, et al., "Lock Reservation: Java Locks Can Mostly Do Without Atomic Operations," IIPSLA '02, Nov. 4-8, 2002, ACM.
Kenneth Russell, et al., "Eliminating Synchronization-Related Atomic Operations with Biased Locking and Bulk Rebiasing," Sun Microsystems, Inc., OOPSLA '06, Oct. 22-26, 2006, ACM.
Torvald Riegel, et al., "Automatic Data Partitioning in Software Transactional Memories," SPAA '08, Jun. 15-16, 2008, ACM.
Pascal Felber, et al., "Dynamic Performance Tuning of Word-Based Software Transactional Memory," PPoPP '08, Feb. 20-23, 2008, ACM.
Michael F. Spear, et al., "Brief Announcement: Privatization Techniques for Software Transactional Memory," PODC '07, Aug. 12-15, 2007, ACM.
Yossi Lev, et al., "Anatomy of a Scalable Software Transactional Memory," 2009 Sun Microsystems, Inc.

(Continued)

*Primary Examiner* — Hashem Farrokh
(74) *Attorney, Agent, or Firm* — Robert C. Kowert; Meyertons, Hood, Kivlin, Kowert & Goetzel, P.C.

(57) ABSTRACT

A system and method is disclosed for fast lock acquisition and release in a lock-based software transactional memory system. The method includes determining that a group of shared memory areas are likely to be accessed together in one or more atomic memory transactions executed by one or more threads of a computer program in a transactional memory system. In response to determining this, the system associates the group of memory areas with a single software lock that is usable by the transactional memory system to coordinate concurrent transactional access to the group of memory areas by the threads of the computer program. Subsequently, a thread of the program may gain access to a plurality of the memory areas of the group by acquiring the single software lock.

20 Claims, 6 Drawing Sheets

OTHER PUBLICATIONS

OpenSolaris, "Cross Reference: disp_lock.c," Oracle 2010. http://cvs.opensolaris.org/source/xref/onnv/onnv-gate/usr/src/uts/common/disp/disp_lock.c.

Dave Dice, et al., "TLRW: Return of the Read-Write Lock," Transact 2009.

Takeshi Ogasawara, et al., "TO-Lock: Removing Lock Overhead Using the Owners' Temporal Locality," Proceedings of the 13th International Conference on Parallel Architecture and Compilation Techniques (PACT'04), IEEE.

U.S. Appl. No. 11/939,372, filed Nov. 13, 2007.
U.S. Appl. No. 12/350,792, filed Jan. 8, 2009.
U.S. Appl. No. 12/492,613, filed Feb. 26, 2009.
U.S. Appl. No. 11/475,716, filed Jun. 27, 2006.

* cited by examiner

FAST AND EFFICIENT REACQUISITION OF LOCKS FOR TRANSACTIONAL MEMORY SYSTEMS

BACKGROUND

In some computer programs, multiple program threads may execute concurrently on a single system and may access shared memory areas. The interleaved execution of such threads in shared-memory, multi-threaded computing environments may cause one or more of the threads to execute incorrectly. For example, if two threads in a banking application are each configured to execute a withdrawal by first checking for sufficient account balance and then making the withdrawal, then incorrect interleaved execution may result, for instance, if both threads perform the account balance check before either thread withdraws the money, resulting in a negative account balance. Thus, interleaved execution of the two threads may result in incorrect program behavior, commonly known as race conditions, which must be avoided.

Programmers of concurrent systems must take care to avoid inopportune interleavings of concurrent operations. To ensure correctness, programmers often rely on various concurrency control mechanisms, such as synchronization locks. A lock is a software or hardware construct associated with one or more memory areas that is used to control concurrent access to that memory areas among multiple threads. For example, a traditional lock may only be held by one thread at a time and allows that thread exclusive access to one or more memory areas associated with the lock. Other locking protocols and/or implementations exist, such as read/write locks that allow multiple threads to hold the lock concurrently for reading but only one to hold it for writing.

Transactional memory is a concurrent programming paradigm that allows programmers to designate a section of code as atomic. A transactional memory implementation then ensures, via underlying software and/or hardware mechanisms, that such sections are executed atomically (i.e., all at once) with respect to other threads in the system. For instance, in the banking example above, a programmer may designate that the account balance check and the withdrawal operation should be executed together atomically with respect to other threads. Thus, by forbidding the interleaved execution described above, the race condition may be obviated. Transactional memory may be implemented in hardware, software, or a combination thereof.

Transactional Locking (TL) is a software-based, transactional memory (STM) technique that ensures the atomicity of transactions using locks. In traditional TL systems, each memory area that might be accessed within a transaction is mapped by the STM to a single lock that manages concurrency and coordinates access to the associated data areas. Each memory area mapped to a lock may correspond to a respective memory objects (e.g., in object-based systems) or to other arbitrary stripes of memory (e.g., in stripe-based systems).

When a thread in a TL system executes a transaction, the STM ensures that the transaction is executed atomically with respect to other threads in the system. The STM may transparently obtain and release the locks associated with each memory area that is accessed and/or modified by the thread during the transaction. If mutually exclusive, read/write locks, and/or other types of locks are used, the STM normally ensures that each lock is acquired in the proper mode.

Traditional locking STMs tend to perform lock acquisitions and releases often. Therefore, the overhead introduced by these operations may be an important determinant of the system's overall performance. Unfortunately, lock acquisition and release operations are often expensive in traditional implementations. For example, in various traditional schemes, lock acquisition and/or release may necessitate that one or more high-latency atomic instructions, such as a compare-and-swap (CAS) instruction, be executed. Accordingly, considerable effort has been devoted to developing STM algorithms that avoid or reduce the frequency of atomic (e.g., CAS) operations.

SUMMARY

A system and method is disclosed for fast lock acquisition and release in a lock-based software transactional memory system. The method includes determining that a group of shared memory areas are likely to be accessed together in one or more atomic memory transactions executed by one or more threads of a computer program in a transactional memory system. In response to determining this, the system associates the group of memory areas with a single software lock that is usable by the transactional memory system to coordinate concurrent transactional access to the group of memory areas by the threads of the computer program. Subsequently, a thread of the program may gain access to a plurality of the memory areas of the group by acquiring the single software lock.

In various embodiments, the determination that the group is likely to be accessed together may be made based on observed dynamic memory access behavior of the one more threads and/or on static analysis of the computer program. For example, in some embodiments the determination may be made, at least in part, because the group of memory areas have been accessed together in a single transaction, from a transaction initiated from a specific call site in the program, from programmer hints, from lexical analysis of the program structure, and/or a number of other factors, as disclosed herein.

In some embodiments, the memory areas may each be mapped to a respective lock record, each lock record including a forwarding pointer. The forwarding pointer of each lock record may point to a respective lock controlling concurrent access to any memory area that is mapped to the lock record. In such embodiments, associating the group of memory areas with the same lock may include modifying a value of the forwarding pointer in one or more of the lock records corresponding to each memory area, to point to the single lock.

In some embodiments, each lock record may include an embedded lock, which forwarding pointers may point to. In such embodiments, the single lock to which every member of group is mapped may be chosen from among the locks contained in the lock records to which the memory areas of the group are already mapped.

In some embodiments, if high contention is detected involving a given memory area of the group, the memory area may be disassociated from the group. For example, in some embodiments, a lock embedded in the lock record corresponding to the given memory area may be used to control concurrent access to the memory area rather than the single lock that corresponds to the group.

In various embodiments, each lock may be a traditional mutual exclusion lock, a read/write lock, and/or other variations.

While the invention is described herein by way of example for several embodiments and illustrative drawings, those skilled in the art will recognize that the invention is not limited to the embodiments or drawings described. It should be understood that the drawings and detailed description hereto are not intended to limit the invention to the particular form disclosed, but on the contrary, the invention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to) rather than the mandatory sense (i.e. meaning must). Similarly, the words "include", "including", and "includes" mean including, but not limited to.

DETAILED DESCRIPTION OF EMBODIMENTS

In traditional software transactional memory systems (STMs), each atomic transaction may include accessing multiple memory locations, which may require the STM to acquire and release multiple locks, each coordinating concurrent access by multiple threads to a different one of the memory locations. However, such acquisition and release may introduce considerable performance overhead, particularly given the high-latency instructions that may be required to complete these operations, such as atomic compare-and-swap (CAS) instructions. In addition, the loop overhead of releasing multiple locks at the end of a transaction may be considerable.

In various embodiments, an STM may be configured to determine that a cluster of two or more individually lockable memory areas are likely to be accessed together within a common transaction in the future. In response to this determination, the STM may associate the members of the cluster with a single lock such that the single lock coordinates concurrent access to all of the members at once. This may be referred to herein as "clustering" the memory areas into a single cluster. For example, in some embodiments, a thread that acquires the single lock may gain transactional access to all the members of the cluster. That is, when executing a transaction that involves accessing multiple members of the cluster, the thread may only need to acquire the single lock rather than a unique lock for each element of the cluster. Thus, the STM may execute more efficiently than do traditional implementations. This technique may be referred to herein as lock clustering.

Figure 1:
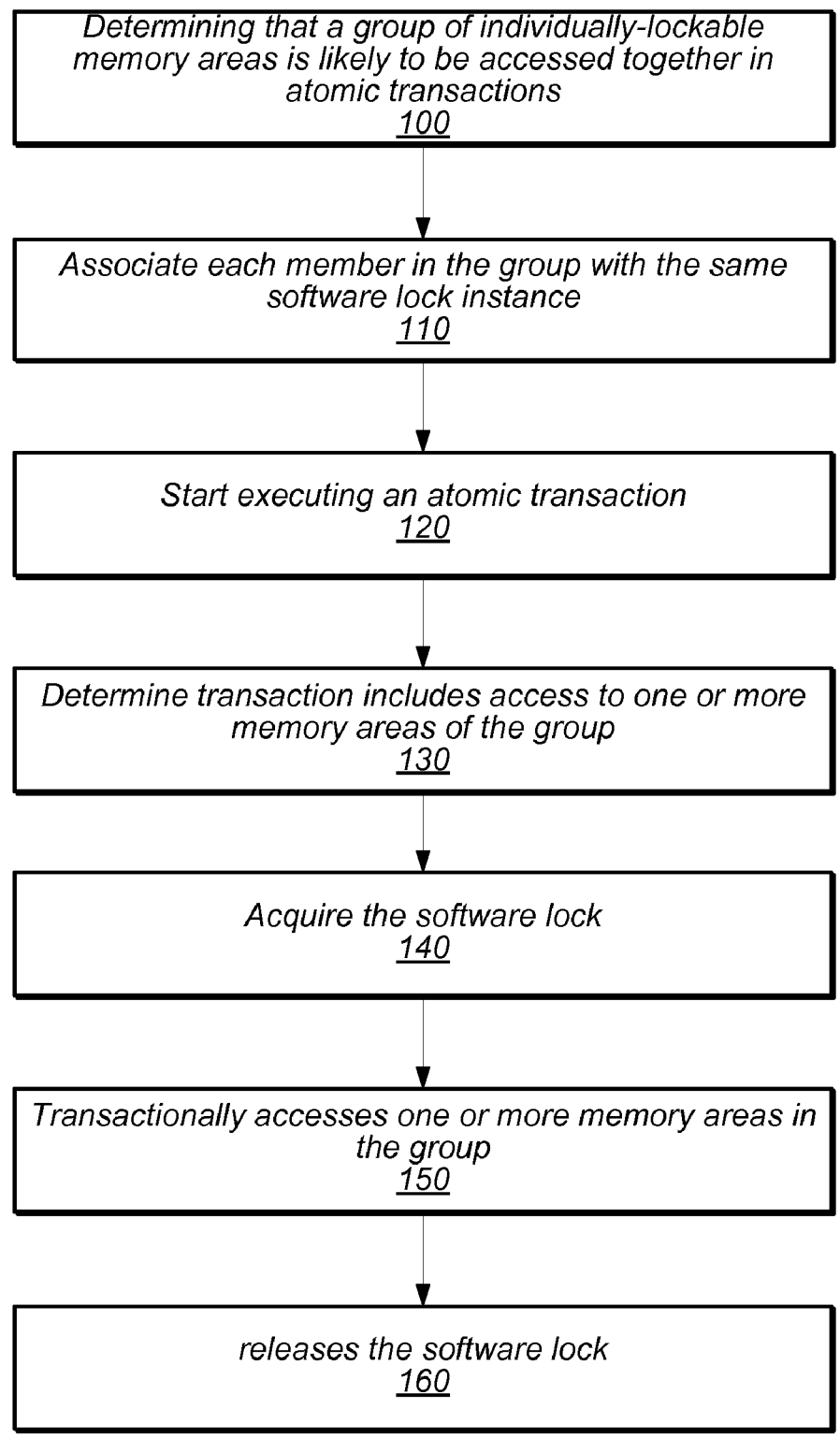
FIG. 1 is a flow diagram illustrating a method for implementing transactional memory using lock clustering, according to some embodiments.

FIG. 1 is a flow diagram illustrating a method for implementing transactional memory using lock clustering, according to some embodiments. The illustrated method may be performed by an STM modified to implement transactional locking with lock clustering. Generally, the STM may ensure that sequences of operations designated by each thread as transactions are executed atomically with respect to the other threads in the system. One skilled in the art will appreciate that, in various embodiments, the STM may implement different transactional locking protocols, including various deadlock avoidance protocols, lock acquisition and/or release orderings, and/or other policies.

According to the illustrated embodiment, the method begins by determining that a cluster of individually-lockable memory areas are likely to be accessed together in atomic transactions of one or more threads, as in 100. In some embodiments, each memory area may correspond to a memory stripe, an object in memory, or to any other memory area that may be associated by an STM with a lock and accessed from within an atomic transaction.

In stripe-based systems, memory may be segmented into a plurality of fixed-size blocks, which may each be associated with a respective lock. While each stripe corresponds to at most one lock, multiple stripes may correspond to the same lock. The term "individually-lockable" here refers to the property whereby each memory stripe corresponds to a respective (not necessarily distinct) lock.

In other embodiments, object-based techniques may be used instead of stripe-based. In such systems, each object instantiated in memory (e.g., declared by the programmer) and accessible from within an atomic transaction may be associated with a lock. Similarly to systems that use stripes, in some embodiments, each object may correspond to at most one lock and multiple objects may correspond to the same lock. Those skilled in the art would appreciate that the techniques described herein are applicable to both object-based and to stripe-based schemes, as well as others. To avoid confusion, objects, stripes, and/or other lockable memory entities are referred to herein as memory areas.

In various embodiments, the initial assignment of locks to each memory area may be arbitrary or based on arbitrary criteria. For example, in some embodiments, the memory address of each memory area may be hashed through an arbitrary hash function to derive an index into an array of available locks and the memory area may then be associated with the lock at that index. In other embodiments, each memory area may be associated with no lock or with a "NULL" lock until a thread first tries to acquire a lock on the memory area. In yet other embodiments, the initial assignment of locks to memory areas may be informed by the code itself, such as through compiler hints or source-code constructs, as described in more detail below.

As shown in 100, in some embodiments, the clustering of memory areas may be dependent on expected dynamic memory access behavior of one or more threads. For example, in some embodiments, if two memory areas are expected to be accessed together often within the same future transaction(s), then the two memory areas may be clustered in 100.

According to the illustrated embodiment, each member of the cluster may then be associated with the same lock instance, as in 110. Since the members of the cluster are likely to be accessed together inside of future transactions, mapping the cluster members to the same lock may confer various performance advantages for future transactions. For example, accessing multiple memory areas of the cluster from within a single transaction may require acquiring only the one common lock to which the areas are mapped.

In the illustrated method of FIG. 1, a thread may then begin executing an atomic memory transaction, as in 120. The atomic transaction may include multiple instructions, including multiple memory access operations to shared memory and to some number of memory areas, including those of the cluster. The shared memory may be concurrently accessible by one or more other threads in the system.

While executing the transaction begun in 120, the thread may require access to one or more memory areas of the cluster, as in 130. In order to access these and/or other shared memory locations within a transaction, the transactional locking protocol implemented by the STM may require that for each memory area accessed (or to be accessed) in the transaction the thread must acquire a corresponding lock. Although a thread is said to acquire a lock, the actual code for performing this acquisition may be implemented as part of the STM implementation rather than as application code. Lock acquisition and release may thus be to various degrees transparent to applications.

In various embodiments, the determining of 130 may differ based on the particular lock acquisition and/or release protocol implemented by the STM. For example, in some embodiments, an STM may be configured to acquire a required but not held lock just before attempting to access a shared memory location from within an active transaction (i.e., encounter-time schemes). In other embodiments, the STM may determine a read and/or write set for each transaction at the onset and acquire the required locks before any of the transaction's memory accesses are performed. In other embodiments, the memory accesses may occur before the lock acquisition and the results stored in a local buffer rather than in shared memory. In such schemes, when all memory operations of the transaction have been completed, the STM may acquire all necessary locks in a lock-acquisition phase before writing the results of the buffer to shared memory in a write-back phase. Other locking schemes are also possible. For clarity, many of the embodiments described below utilize an encounter-time scheme (i.e., locks are acquired during the speculative execution phase immediately prior to the first access to a given location) though given the benefit of this disclosure, those skilled in the art will appreciate that the techniques described herein may be applied to systems utilizing various other transactional locking schemes, such as commit-time locking.

In response to determining that the transaction includes access to one or more memory areas of the cluster, as in 130, the thread may acquire the cluster's software lock, as in 140. Since each member of the cluster is associated with this lock, acquiring the lock may permit the thread to access any of the memory areas of the cluster from within the transaction. Therefore, the thread may access one or more memory areas in the cluster, as in 150, before releasing the software lock and finishing the transaction, as in 160. Thus, to access multiple memory areas in the cluster, the thread may only need to acquire the one lock associated with the multiple memory areas rather than a separate lock for each memory area, as is traditionally required in other systems. Since lock acquisition and/or release may be relatively expensive operations in terms of performance, the method of FIG. 1 may allow an STM to operate more efficiently than do more traditional implementations. In addition, since memory areas may be accessed together in different transactions, such a clustering scheme may be able to leverage inter-transactional patterns of temporal locality.

Figure 2:
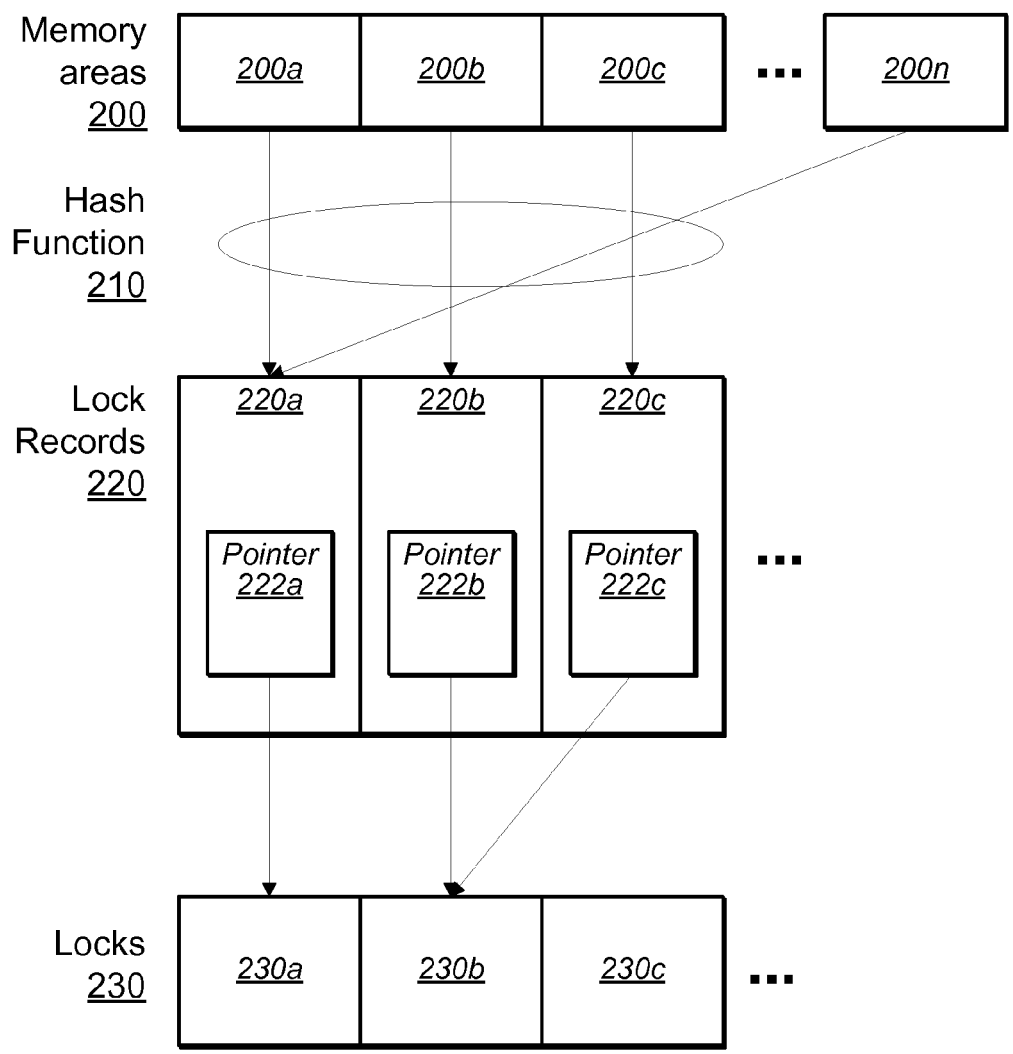
FIG. 2 is a block diagram illustrating a configuration for associating memory areas with various software locks, according to some embodiments.

In various embodiments, associating each memory area with a software lock may be performed in different ways. FIG. 2 is a block diagram illustrating a configuration for associating memory areas with various software locks, according to some embodiments.

According to the illustrated embodiment of FIG. 2, each of memory areas 200 is mapped to a respective lock record 220. This mapping may be done in various ways. For example, a memory address of each memory area (e.g., the start address) may be hashed using a hash function, such as 210, to produce an index into an array of lock records 220. In some embodiments, hash function 210 may be chosen based on one or more particular properties governing its expected probability distribution. For example, a hash function that produces a uniform distribution of indices given the expected inputs (e.g., memory area addresses) may be chosen. In some embodiments, multiple memory areas may be mapped to the same lock record. For example, in the illustrated embodiment, memory areas 200$a$ and 200$n$ are each mapped to lock record 220$a$.

Each lock record 220 may be associated with a unique software lock. This may be done in some embodiments by including a lock data structure in the lock record itself. In other embodiments, such as that pictured in FIG. 2, each lock record 220 may contain a pointer 222 to a respective lock data structure 230. A pointer may contain a memory address usable to locate a respective one of locks 230. As illustrated in FIG. 2, it may be possible for multiple pointers to point to the same software lock instance (e.g., pointers 222$b$ and 222$c$ both point to 230$b$).

In pointer type embodiments, such as that illustrated in FIG. 2, each memory area in a given cluster may correspond to the same lock 230, although not necessarily to the same lock record 220. For example, in the illustrated embodiment, memory areas 200$b$ and 200$c$ are associated with different lock records (i.e., 220$b$ and 220$c$ respectively). However, the respective pointers of lock records 220$b$ and 220$c$ each identify the same lock (230$b$). Therefore, both memory areas 200$b$ and 200$c$ are associated with the same software lock.

In some embodiments, the values of pointers 222 may be reconfigurable during runtime. For example, in some embodiments, each memory area may be associated with an initial lock record and/or lock in an initial mapping. Subsequently, the initial mapping may be modified during runtime (e.g., by modifying the value of the respective pointer). Reconfiguration may enable clusters of memory areas to be dynamically formed and changed during runtime in response to dynamic memory access patterns of the executing threads. For example, in some embodiments, if an observed dynamic memory access pattern indicates that two or more memory areas are likely to be accessed together within future transactions, the STM may cluster those memory areas, such as by modifying the values stored in each pointer of their respective lock records to point to the same lock instance.

Figure 3:
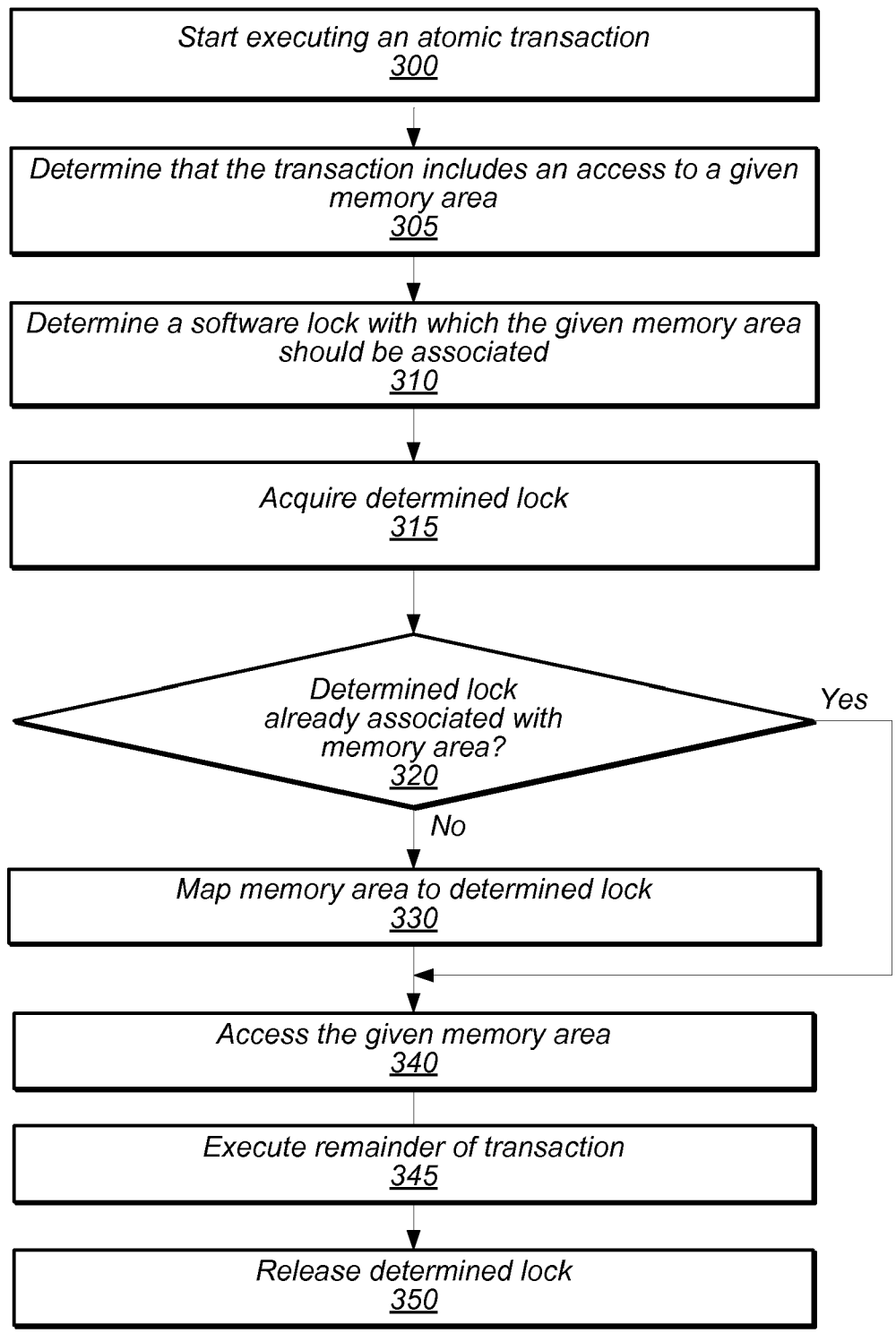
FIG. 3 is a flow diagram illustrating a method for dynamically reconfiguring the mapping between a memory area and a lock at runtime, according to some embodiments.

FIG. 3 is a flow diagram illustrating a method for dynamically reconfiguring the mapping between a memory area and a lock at runtime, according to some embodiments. In the illustrated embodiment, the method includes starting a transaction, as in 300, and determining that the transaction includes access to a given memory area, as in 305.

As in the illustrated embodiment, the system may then determine the identity of a software lock with which the memory area should be associated, as in 310. In some instances, the determined software lock may be chosen because it is already associated with one or more other memory areas that are likely to be accessed together with the memory area in future transactions. Various strategies may be used for determining this correlation, some of which are disclosed in detail below.

According to the illustrated embodiment, the method of FIG. 3 may then include acquiring the determined lock, as in 315. If the determined lock is already associated with the memory area, as indicated by the affirmative exit from 320, the thread has already acquired the required lock (i.e., in 315) and may therefore access the given memory area (as in 340), execute the remainder of the transaction (as in 345), and eventually release the determined lock (as in 350).

In some embodiments, determining whether the lock is already associated with the determined lock (as in 320) may include de-referencing the forwarding pointer associated with the memory area. In other embodiments, the performance overhead of performing this de-referencing may be avoided by examining the forwarding pointer's value rather than de-referencing it. In some embodiments, the determined lock is associated with the memory area if and only if the forwarding pointer for the memory area contains the memory address of the determined lock. This evaluation may be performed without the need to de-reference the memory address.

However, if the determined lock is not already associated with the given memory area, as indicated by the negative exit from 320, the method may include associating the given memory area with the determined software lock rather than with the lock to which the memory area currently corresponds, as in 330. Since the thread then holds the lock required for accessing the given memory area, the remaining steps (340-350) may then be executed.

Performing step 330 in a thread-safe manner may involve several sub-steps. For example, in some embodiments, remapping the memory area to a different lock (as in 330) may require the thread to first acquire the lock with which the memory area is currently associated. In some embodiments, a thread may accomplish this by fetching the forwarding pointer for a given memory area to learn the current identity of the lock for that memory area, acquiring permissions on the lock, and then ratifying that the forwarding pointer still refers to the same lock that the thread acquired. If so, then the forwarding pointer remains stable until the thread releases permissions on the lock. Otherwise, the acquired lock is stale (i.e., the forwarding pointer no longer points to the acquired lock). In this case, the thread may release the stale lock and attempt to acquire the new lock identified by the forwarding pointer associated with the memory area. Once the proper lock has been acquired and ratified, the thread may modify the forwarding pointer associated with the memory area to point to the lock determined in 315. In some embodiments, acquiring the determined lock (as in 315) may involve a similar acquisition/ratification procedure.

Figure 4:
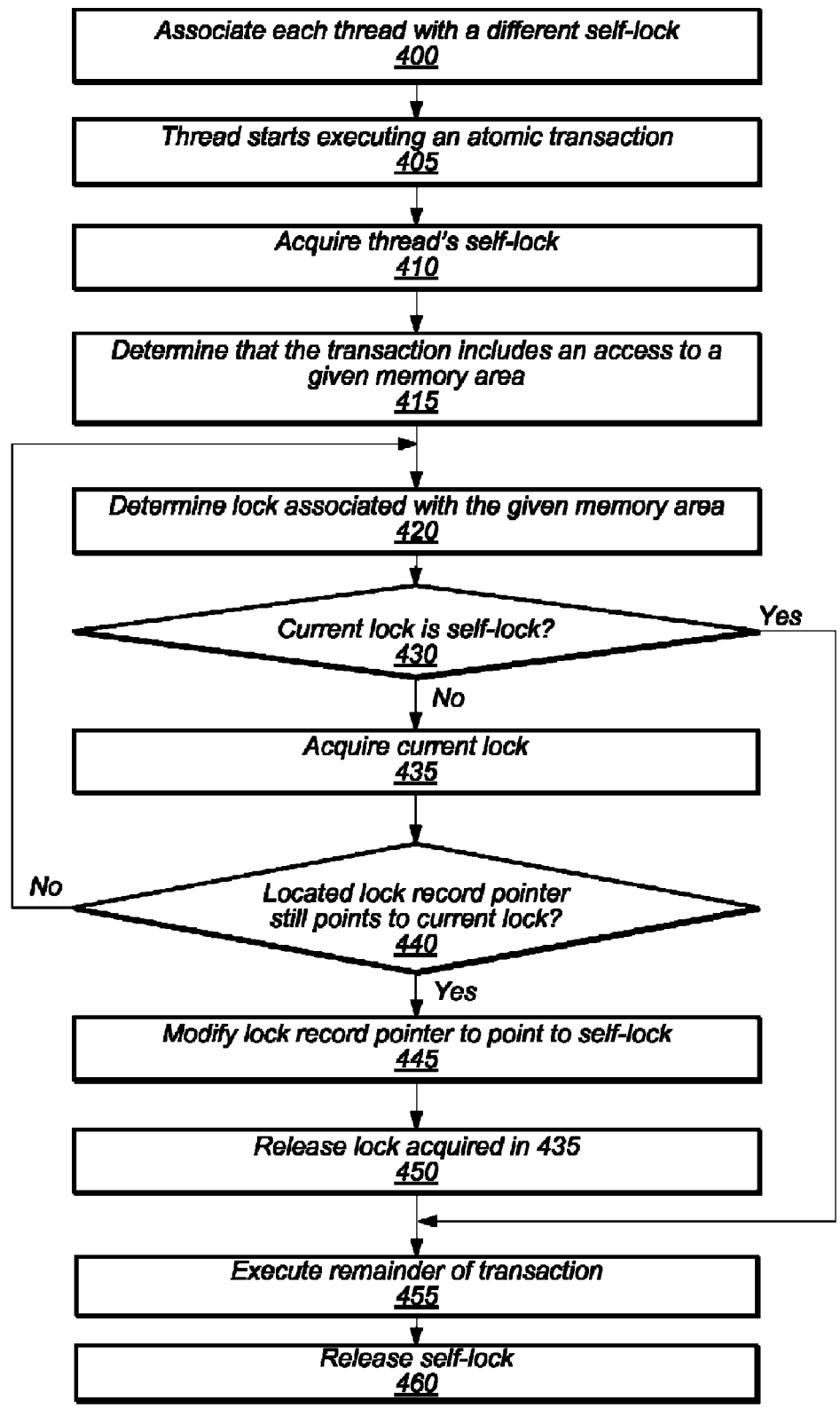
FIG. 4 illustrates a method for dynamically remapping a memory area to a lock associated with a cluster of memory areas that are likely to be accessed together in future transactions, according to some embodiments.

As discussed above, various embodiments may determine software locks with which to associate a given memory area in different ways. FIG. 4 illustrates one such method for dynamically remapping a memory area to a lock associated with a cluster of memory areas that are likely to be accessed together in future transactions.

In 400, each thread in the system is associated with a unique software lock, which may be referred to herein as a self-lock. The self-lock may be referenced by forwarding pointers, such as 222 of FIG. 2. According to the illustrated embodiment, the thread may begin a transaction, as in 405. Before accessing any shared memory location from within the transaction, the thread may acquire its own self-lock, as in 410. In some embodiments, the thread may acquire its own self-lock using one or more atomic operations, such as CAS operations.

As described above in reference to FIG. 3, the system may determine that the transaction includes an access to a given memory area (as in 415) and therefore the thread may be required to hold the lock associated with that memory area.

As in the illustrated embodiment, the system may locate the lock record associated with the given memory area (as in 420). For example, the system may hash a memory address of the memory area to determine a lock record and follow the forwarding pointer of the determined lock record to locate the lock.

If the given memory area corresponds to the thread's self-lock (as indicated by the affirmative exit from 430), the thread may continue to execute the transaction (as in 455) and eventually release the self-lock when the transaction is finished (as in 460). Thus, in such embodiments, the thread may continue to hold the self-lock for the duration of its transactional attempt.

However, if the given memory area does not correspond to the thread's self-lock (as indicated by the negative exit from 430), then system may modify the memory area mapping to associate the memory area with the self-lock rather than with its currently associated lock (e.g., as in 330 of FIG. 3).

In the illustrated embodiment, remapping the memory area to the thread's self-lock may include at least three steps. First, the thread attempts to acquire the lock currently associated with the given memory area, as in 435. This may include executing one or more atomic update operations (e.g., CAS operations) in an attempt to acquire the lock. If the lock is held (e.g., by another thread), then the thread may continually or intermittently reattempt to acquire the lock. The lock may be held, for example, when the forwarding pointer associated with the memory area points to the self-lock of a different thread and that different thread is actively executing a transaction. In some embodiments, after a bounded duration, the thread may abort the transaction and reattempt.

According to the illustrated embodiment, once the thread acquires the lock, as in 435, it may verify that the forwarding pointer (of the lock record associated with the memory area) still points to the acquired lock. If not, as indicated by the negative exit from 440, then the thread may determine the identity of the new lock and attempt o acquire that lock, such as by repeating steps 420-435.

According to the illustrated method, once the thread has acquired the current lock (as in 435) and verified that it is still the one controlling concurrent access to the memory area (as indicated by the affirmative exit from 440), it may modify the lock record corresponding to the given memory area to point to the thread's own self-lock, as in 445. Since the thread already acquired the self-lock in 410, the thread then has permissions to access the given memory area. As in the illustrated embodiment, the thread may then release the old lock (as in 450) and execute the remainder of the transaction (as in 455), which may include accessing the memory area, before releasing its own self-lock (as in 460).

In the scheme of FIG. 4, each memory area accessed by a given thread during a given transaction is mapped to a unique lock associated with the thread. Thus, the set of memory areas accessed during a given transaction are dynamically clustered under the same lock. On subsequent attempts to perform the same transaction, a thread may therefore need to acquire only the one lock (its self-lock) for access to the multiple memory areas in the cluster. However, if a different thread were to access one or more of the memory areas transactionally, that other thread may reassign the accessed area(s) to its own self-lock (as in 435-450). A subsequent attempt by the first thread to access these memory areas from within a transaction may involve the first thread remapping the memory areas to its own self-lock, etc.

Various other schemes are possible for dynamic lock mapping. For example, rather than associating a self-lock with each thread, in other embodiments, a unique lock may be embedded in each lock record and each forwarding pointer of each lock record may point to one of these embedded locks (not necessarily to the lock in the same lock record).

In one such embodiment, executing a transaction may include choosing a memory area from those accessed from within the transaction (the transaction's access set), determining the lock associated with that chosen memory area (the "canonical" lock), and using the canonical lock instead of the associating each memory area in the transaction's access set with that lock as is done in FIG. 4. This method may be analogous to that of FIG. 4, but instead of the self-lock, each memory area may be associated with the determined canonical lock.

In one example of this scheme, suppose thread T1 accesses memory areas S1, S2, and S3 transactionally. In that case, the transaction may acquire S 1's lock and set the forwarding pointers of S1, S2, and S3 to refer S1's lock. T1 could subsequently release S1 S2 and S3 simply by releasing the lock in S1. If T1 were to subsequently attempt to reacquire S1, S2, and S3, it may first lock S1 and in so doing, acquire the lock in S1. Since the forwarding pointers in S2 and S3 refer to S1's lock (unless they were intermediately modified by another thread), S2 and S3 would then already be locked by T1. Likewise, T1 may benefit from the fast lock release enabled by having multiple memory areas associated with the same lock.

The lock record based scheme described above may similarly confer inter-transactional benefits. For instance, in the example above, if another thread were to acquire the lock for S1, it would also gain access to S2 and S3. Thus, when clusters of memory areas tend to be accessed together across transactions and/or threads, the lock record based scheme may introduce some inter-thread performance benefits that may leverage repetitive access patterns across threads.

In various other embodiments, other schemes may be used for dynamically mapping memory area clusters to common locks. For example, in some embodiments, a unique lock record may be associated with each call site of a transaction or of a method that is commonly called from within transactions. The method of FIG. 4 may be adapted so that the lock records of all objects accessed from this call site are mapped to point to the lock record for the call site. Since, in some applications, a transaction typically accesses the same set of objects at a particular call site, this scheme may result in efficient lock clustering. For instance, consider a linked list data structure, where access to the list is not scalable and associating a lock record per list node will only exacerbate contention for transactions. Lock clustering of all the list nodes into a single list lock at the insert/delete/lookup methods of the list may deliver much better performance in this case.

In another embodiment, locking clusters may be dynamically configured using memory allocation sites. In such embodiments, memory objects allocated close-by (e.g. within a method's scope) may be associated with the same lock record. In some embodiments, each individual invocation of such a code-block may create a new cluster lock. This may provide performance benefits since there may exist applications in which objects allocated near each other are often accessed together by threads.

In another embodiment, locking clusters may be dynamically configured using thread-allocation sites. In such a technique, each thread may be assigned a distinct lock similar to the "Per Thread clustering" technique, and the lock records of objects allocated by each thread are initialized to the allocating thread's lock. This technique may leverage the observation that, in many applications (e.g. applications with per-thread shared data partitioning, where a thread almost always accesses objects in its data partition), objects allocated by a thread are most often thread-local, but cannot be determined to be so by any advanced compilation tools such as escape analysis.

In yet other embodiments, locking clusters may be configured using programmer hints. Such techniques may rely on the programmer providing the STM with various hints about what shared objects can be used as cluster hubs. For example, a particular programming language may be configured to support special type qualifiers that designate a "distinguished" status to the variables qualified with a special keyword (e.g., clusterlock/clusterhub/etc). One example is provided by the Java-like syntax below:

```
class RedBlackTree {
    ...
    clusterhub RedBlackTreeNode rootNode;
    ...
}
```

In the example above, the programmer annotates the root node of the red black tree as a distinguished variable. The distinguishing feature of such variables may be that they will be considered as "cluster hubs" by the runtime system for lock clustering —Any shared object accesses that occur in the "vicinity" of a cluster hub hints the runtime system that it may add those shared objects to that hub's cluster.

Furthermore, the lock records of all objects in a cluster may point to that cluster's hub's lock record. In other words, the ability to designate variables as cluster hubs enables the programmer to hint data access patterns of the application to the runtime system. This ability may be particularly useful for applications where the system is unable to automatically infer the most effective clustering policy for the application.

In various embodiments, different definitions of "vicinity" may be used. For example, in some embodiments, vicinity of an access to cluster hub H may encompass all shared memory accesses appearing, within a transaction T, after T has accessed H and before T accesses another cluster hub H' that is not H. In some other embodiments, vicinity of an access to a cluster hub H may refer to the lexical scope of the function or method within which the access occurs. In object oriented languages such as C++ or Java™, vicinity of accesses to a cluster hub H may refer to the lexical scope of all the functions and methods of the type of H.

In yet other embodiments, the language may provide constructs that can be used to explicitly delineated the vicinity of a cluster hub. For instance, the language may introduce a construct (e.g., cluster(H) { . . . }) to lexically mark a block of code as the vicinity of a cluster hub H. Alternatively, in some embodiments, a runtime system may introduce a library API method/function such as void endscope(H); to end the "scope" of a cluster hub H. In some embodiments, the runtime system may provide a relatively elaborate clustering API such as the following (in Java-like syntax):

```
interface ClusteringAPI {
    // method to designate an object as a cluster hub
    void makeClusterHub(Object hub);
    // method to begin the scope of a cluster hub
    void beginscope(Object hub);
    // method to end the scope of a cluster hub
    void endscope(Object hub);
}
```

In such embodiments, the methods of the ClusteringAPI interface may serve as hints to the runtime system to designate and use the specified object as a cluster hub.

In some embodiments, lock clustering may be applicable in the context of transactional memory implementations of lock-elision techniques in languages such as Java™ that contain language support for synchronization between concurrent threads (e.g. the "synchronized" construct in Java™). In such embodiments, the transactional memory runtime system may treat the object on which the synchronization happens as the cluster hub and/or limit the scope of that hub to the synchronized block or method scope.

In some embodiments, the programmer may be provided with language constructs or library interfaces to designate call sites within application code as the hub of a cluster. For instance, the language can introduce a method modifier called (e.g., "clustersite") that associates a lock record with that method. A language compiler may be configured to pass on a hint to the TM runtime system to use this lock record within a transaction, within the scope of that method.

The technique described above may be particularly useful in cases where the call site determines what set of objects are accessed within a complex collection of objects. For instance, consider an application that contains a forest-of-trees data structure with a large number of trees. Furthermore, assume that a transactions rarely access overlapping set of trees. In this case, designating the specific methods that manage each individual tree as the distinguished call sites may enable the runtime system to aggressively enforce clustering for better performance.

In some embodiments, lock clustering may be implemented using locality-based clustering. In this context, the concept of "locality" may refer to the general observation that objects (i.e., memory areas) in a collection of objects accessed by a computation in the most recent past are likely to be accessed by that computation in the near future. There exist several data flow analysis and program profiling based tools (for example: reference affinity analysis tools) that may be configured to determine the set of objects that are often accessed together. Locality-based clustering, as used herein, may refer to the technique of leveraging the program locality analysis information to generate object clusters with a designated cluster hub. In some such embodiments, the clustering technique may take a collection of objects (provided by the data flow or profiling based tools) as the input, creates a cluster lock for these objects, and include them in the corresponding cluster (which may be done by forcing each object's lock record to point to the cluster lock).

In yet other embodiments, lock clustering may be implemented using phase-based clustering. Applications often execute in "program phases" where data access patterns, including working sets, of the application change over each distinct phase. In some embodiments, applications may be analyzed to determine program phases and/or predict the variability of data access patterns in these phases. In various embodiments, this may be performed using profiler-based tools or be implemented in managed language environments (e.g., Java™ Hotspot™ JVM). Phased clustering of transactional memory locks may refer to leveraging this information about data access patterns in different program phases to configure clusters of TM locks. For instance, consider a program that contains objects A, B, C, and D. In phase 1, objects A and B are accessed together, and objects C and D are accessed together. Thus A and B can be assigned to a cluster, and C and D can be assigned to another cluster. However, in phase 2, suppose that objects B and C are always accessed together, and A and D are accessed together. Using phase 1 clusters for these objects may result in "false conflicts" between concurrent transactions that access either B and C or A and D. If the clusters of phase 1 are reconfigured to contain B and C or A and D in each cluster, the possibility of false conflicts between concurrent transactions accessing either one of the object pairs may be eliminated.

In some embodiments, phased clustering mechanisms may be configured to receive an input that contains collections of objects that are accessed together along with information about the phase transition points in the program. Based on this information, the runtime system may reconfigure the TM lock clusters at phase transition points. In some embodiments, this may be done by assigning a new cluster lock to each collection in the new phase, and changing the forwarding pointers of one or more objects in a collection to point to that collection's cluster lock. In some embodiments, cluster locks from the previous phase may be reused for this purpose, provided they do not lead to overlap between multiple collections of objects in the new phase.

In some embodiments, the reconfiguration of clusters may be done by a single thread, which may be determined in any of several ways. These may include: assigning a predesignated thread that reconfigures clusters, assigning the responsibility of reconfiguration to the thread that is the first to detect a phase change, etc., or a collection of threads. In some instances, concurrent execution of transaction during the reconfiguration step can possibly undermine the atomicity and isolation properties of those transactions because the objects accessed by these transactions may be a part of the reconfiguration process. To account for this, in some embodiments, an invariant that during cluster reconfiguration no concurrent transactions are permitted to execute, may be enforced. Threads may concurrently execute non-transactional code without any problems. In some embodiments, this invariant may be enforced using various techniques including maintaining a shared counter of "live" transactions. This counter may be incremented when a transaction begins execution and decremented when it completes. In some embodiments, a scalable non-zero indicator may be used to implement the counter.

Another scheme that may be implemented for performing dynamic memory area clustering is random clustering. Random clustering may refer to a technique of randomly assigning an object to some cluster. Several variants of this method are possible. In one variant, during an object access, a transaction may randomly pick a cluster for the object, if the object does not already belong to the cluster. In another variant, a transaction may randomly choose a cluster at the beginning of its execution and add to this cluster all unassigned objects that the transaction subsequently accesses. This technique may reduce the sparse distribution of lock-cluster mappings that may result from the prior variant.

In other embodiments, memory area clustering may be based on type reachability based clustering. In many software applications, instances of a type can be reached only through instances of another (single) type. In such instances, access to a reached object is always accompanied by access to an intermediate (enclosing) object. Clustering based on type reachability may leverage the type reachability property to cluster the reached objects with the enclosing objects.

In yet other embodiments, memory area clustering may be performed using immutability based clustering. In some software applications, large sets of objects may be only rarely modified. In embodiments wherein the TM locks are read/write locks (i.e., a lock may be concurrently held by multiple threads for read-only access but by only one thread for write-access to the corresponding memory area(s)) such memory areas may almost always be accessed in read-only mode. In some embodiments, a compiler may be configured to detect such objects and include them in a global cluster of rarely modified objects.

Many of the variations described above may be implemented using methods analogous to that of FIG. 4. However, instead of associating all memory areas with a self-lock associated with the executing thread, a different cluster lock may be used. Some embodiments described may be used during and/or combined with static analysis to produce efficient clusters.

One drawback of lock clustering, as described above, is that the scheme may sometimes admit false conflicts. False conflicts may arise when a first thread T1 requires transactional access to only a subset of a cluster of memory areas while another thread requires transactional access to a separate, non-intersecting, subset of the same cluster. Although the access sets of the two threads do no intersect, each thread must acquire the same cluster lock to execute its respective transaction. Thus, in such situations, a conflict may occur between two or more concurrent threads executing respective transactions, even when their respective memory access sets do not intersect.

For example consider the scheme of FIG. 4 where a thread associates each memory area in a transaction's access set with a self-lock. In such a system, a thread T1 that locks memory area S as part of executing a given transaction may ensure that the forwarding pointer associated with S points to T1's self-lock. Even after that first transaction ends, the forwarding pointer for S may still point to T1's self-lock. Therefore, if T1 begins executing a second transaction, T1 acquires its own self-lock therefore locks S, even if the second transaction does not require access to S. If another thread T2 attempts to execute a transaction that requires access to S, it may attempt to modify the forwarding pointer for S to point to T2's self-lock. However, since doing so would require acquiring T1's self-lock (which is currently held by T1), a conflict may result. Since T1 and T2 access disjoint memory area sets, they could theoretically proceed safely in parallel but cannot due to the false conflict arising from the "stale" forwarding pointer T1 left in S. Such false conflicts can sometimes restrict the potential parallelism enjoyed by an application and may thus present a potential scalability impediment in the presence of inter-thread sharing.

In various embodiments, precautions may be taken to guard against the occurrence and/or detrimental performance effects of false conflicts arising from lock clustering. Different techniques may be used to avoid false conflicts. For example, in some embodiments, after the system encounters false conflicts on a given memory area, it may simply redirect the forwarding pointer in the lock record for the memory area to refer to a unique lock associated with the memory area. In some embodiments, this lock may reside in the memory area itself or in the lock record. Thus, a given memory area may be effectively removed from its current cluster and associating it with its own, single member cluster. This may be thought of as qualitatively equivalent to using a classic "direct lock" mode for the memory area (i.e., lock records and locks stand in a stable 1:1 relation). In some embodiments, a direct lock may take the form of a primitive CAS-based spin lock providing mutual exclusion, a read/write lock, a ready/write bytelock (as in U.S. patent application No. 12492654), or other locks.

In some embodiments, instead of setting the forwarding pointer to refer to a target lock as the direct lock, the lock may be collocated in the lock record itself. For example, in some embodiments, some bits in the forwarding pointer (e.g., the low order bits) may be configured to contain a sentinel value to indicate if a value of the forwarding pointer should be interpreted as a normal forwarding pointer or as a direct lock. That is, each forwarding pointer may be interpreted as either a forwarding pointer or a direct lock. In some instances, the overloaded encoding may be more space efficient than is implementing both pointer and separate direct locks and may avoid performance overhead associated "pointer chasing".

In embodiments that allow mixed direct and indirect locking, appropriate modification may be made to the stripe acquisition and release protocols so that threads could effectively discriminate between indirect and direct locks. For example, as part of step 420 in the method of FIG. 4 ("determine lock associated with the given memory area"), the thread may check bits of the lock record for the given memory area to determine whether the value in the lock record describes an indirect lock (i.e., forwarding pointer) or a direct lock. Furthermore, after acquiring a direct lock, the thread may not adjust the forwarding pointer as with indirect locks. In addition, at the end of its transaction, a thread may need to release individual direct locked locations during its lock-release phase.

In some embodiments, the system may be configured to monitor the occurrences and/or frequency of false sharing incidents. The system may optimistically try to aggregate memory areas under the same lock, but if some clustering causes excessive false conflicts, then various memory areas may be deaggregated (e.g., by converting their corresponding lock records to direct locks). In some embodiments, locks and/or memory areas that have been involved in frequent conflict may be transiently marked as resistant to subsequent clustering.

In some embodiments, the system may be configured to detect and recover from false conflicts by determining whether the conflict is false, and if so, safely resting the stale forwarding pointer from its current owner. For example, in the scheme wherein each thread has a separate self-lock, a thread T1 attempting to acquire a lock on a memory area S that is being held by a second thread T2, may first determine whether S is in fact in T2's access set. If so, then the conflict is true and if not, then the conflict is false. If the conflict is true, then T1 may block or otherwise defer to T2. Otherwise, if the conflict is false (e.g., the pointer is stale), then T1 may attempt to safely wrest the forwarding pointer for S from T2 and then proceed normally.

In some embodiments, a thread may identify a false conflict by directly examining the access-set of a transaction being executed by another thread to determine whether a given memory area is present. In embodiments where read/write locks are used, an access-set may be composed of a read-set and a write-set, each representing the memory areas for which the thread has acquired read-only permissions and write permissions respectively. In such cases, the thread conflicts with the other thread only when both access the same memory area and at least one has done so for write access.

In some embodiments, each thread may maintain a summary of the access-set in the current transaction in a query-optimized data structure, such a Bloom filter. In such embodiments, a thread attempting to determine whether a given element is another thread's access-set could query the filter. If the check is positive, then the querying thread may presume a true conflict and block. However, since false positives are possible in some filter implementations (e.g., Bloom filters), a thread may respond to a positive result by attempting to confirm the result, such as by checking the other thread's access-set directly.

In some embodiments, if a conflict is determined to be false, a thread may attempt to safely "seize" the memory area (e.g., modify the forwarding pointer for the memory area to point to the thread's own self-lock rather than to another lock). An STM may be configured to provide this functionality by using various mechanisms.

In some embodiments, each thread may be associated with a respective barrier, which may be represented by a barrier field. Each barrier field may encode different values that signal whether or not the barrier is raised and/or is eligible to be raised. For example, in some embodiments, a barrier value less than zero may signal that the barrier is not eligible to be raised, a barrier value of 0 indicates that the barrier is eligible to be raised, and a value greater than zero indicates that the barrier is raised. Such barriers may be usable to implement a safe lock seizing protocol, such as in FIG. 5.

In some embodiments, a thread may ensure that its own barrier field is not eligible to be raised (e.g., holds a value less than zero) while the thread is in a lock-acquisition phase of executing a transaction. In addition, the thread may not begin executing a lock-acquisition phase of a transaction while its barrier is raised. Therefore, the barrier of each thread is ineligible to be raised if and only if the thread is executing a lock-acquisition phase of a transaction.

In some embodiments, a first thread may safely seize a memory area from a second thread only after having successfully raised the second thread's barrier. Thus, the first thread ensures that the second thread is not engaged in a lock acquisition phase before attempting to seize a memory area from the second thread.

Figure 5:
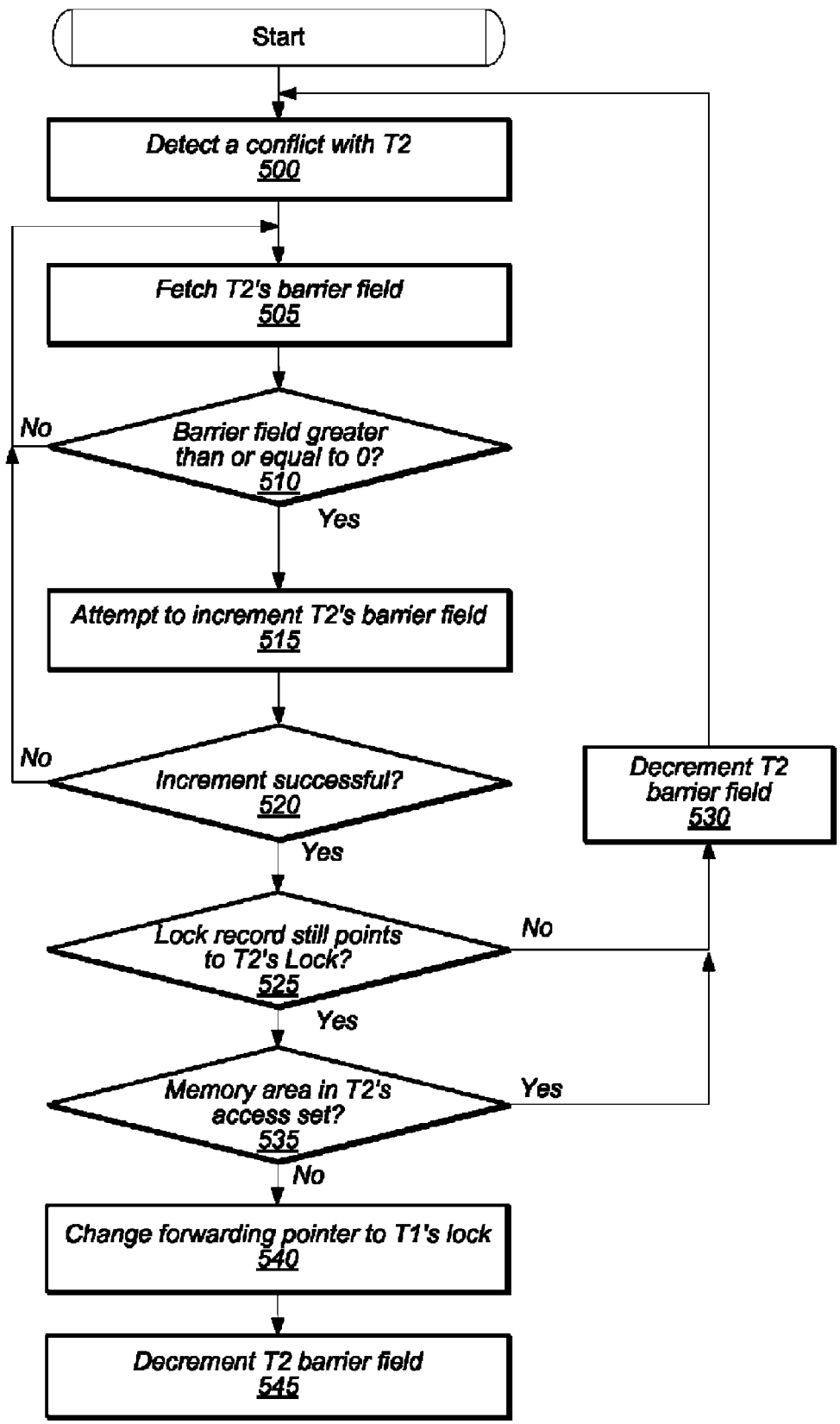
FIG. 5 is a flow diagram illustrating a protocol for a thread safely seizing a memory area from another thread using barriers, according to some embodiments.

FIG. 5 is a flow diagram illustrating a protocol for a thread safely seizing a memory area from another thread using barriers, according to some embodiments. According to the illustrated embodiment, the method may begin when a thread T1 detects a conflict with another thread T2, as in 500. As described above, the conflict may arise because T1 is attempting to execute a transaction that accesses a memory area that corresponds to T2's self-lock, which T2 is currently holding (i.e., T2 is executing a transaction).

In the illustrated embodiment, T1 may then fetch and examine the value in T2's barrier field, as in 505. If the barrier is not available (e.g., value is less than zero, as indicated by the negative exit from 510), then T1 may wait for the barrier to become available. This waiting may involve the thread blocking and/or spinning for a bounded time. The thread may repeatedly recheck the barrier field to determine whether the value has changed, as indicated by the feedback loop from 510 to 505.

Once the barrier is available to be raised (e.g., if the value is greater than or equal to 0), as in the affirmative exit from 510, T1 may attempt to raise T2's barrier. In the illustrated embodiment, this may be done by incrementing T2's barrier field, as in 515, such as by using an atomic CAS operation. If the CAS is unsuccessful, as indicated by the negative exit from 520, then the thread may reattempt the seizure, as indicated by the feedback loop from 520 to 505.

If T1 has successfully erected T2's barrier, as indicated by the affirmative exit from 520, T1 may verify whether the lock record for the desired memory area still points to the self-lock of T2. If this is not the case, as indicated by the negative exit from 525, then T1 may decrement the barrier field (as in 530) and restart the lock acquisition process for the memory area, as indicated by the feedback loop from 530 to 500.

Otherwise, if the lock record for the memory area still points to the self-lock of T2, as indicated by the affirmative exit from 525, then T1 may check for a false conflict. For example, T1 may check whether the memory area is in fact in T2's access set (as in 535) by referencing a data structure of T2 and/or a Bloom filter used by T2 to track the access set in an active transaction. In some embodiments, the access set of a thread may be considered empty when the thread is not actively executing a transaction.

If the memory area is in the access set of T2 (as indicated by the affirmative exit from 525) then the conflict is true and T1 may decrement T2's barrier field (as in 530) and wait until T2 releases the lock. In some embodiments, this waiting may be implemented as a bounded spin. In other embodiments, more complex mechanisms may be implemented. For example, in some schemes, the STM may attempt to detect cycles in the dependencies between waiting threads and abort one or more of those threads if a cycle is detected. In yet other embodiments, deadlock may be avoided by each transaction acquiring its locks in a predetermined order (e.g., according to lock record address).

However, if the memory area is not in the access set of T2 (as indicated by the negative exit from 535), then the conflict is false. In such a case, T1 may then change the forwarding pointer for the memory area to point to the self-lock of T1 (as in 540) and decrement the barrier field of T2 (as in 545).

In some embodiments, the barrier scheme may be replaced with a read/write lock where the thread attempting to enter its acquisition phase acquires exclusive access to the lock as a writer and the one or more threads trying to wrest stale locks from that thread attempt to acquire the read/write lock as readers. In such a configuration, a thread T1 may acquire its own barrier as a writer when commencing a transaction and a thread T2 acquires another thread T1's barrier as a reader when attempting to seize a memory area from T1.

In these embodiments, the barrier and/or lock may serve as an impediment to prevent a thread from implicitly locking "old" stale stripes that remain forwarded to that thread's self-lock. Recall that when a thread T1 acquires its own self-lock it implicitly locks any stale forwarding pointers that still refer to T1. In some embodiments, the barrier and self-lock of each thread may be combined into a single field.

Another way to discriminate between true and false conflicts is to encode or associate a "transaction sequence number" with each forwarding pointer. In such embodiments, each thread may have a transaction sequence number that it incremented when starting a transaction. The thread may then annotate the forwarding pointers of the locks it acquired with its current transaction version number. A potentially conflicting thread T2 could compare the version number associated with the pointer S with the referent thread T1's version number. If they differ then the pointer is known to be stale and, as described above, T2 could try to seize S from T1. In some embodiments, a relatively narrow pointer transaction sequence number (i.e., consisting of just a few bits) may suffice in conservatively distinguishing stale forwarding pointers from currently active pointers.

The clustering mechanisms described herein are composable in that they may be applied to augment existing STM designs. Clustering techniques can be used as an orthogonal "add on" to accelerate reacquisition of locks that are frequently acquired by a single thread. In such embodiments, the system may optimistically assume clustering model operation for all memory areas and adaptively shift or resort to the original underlying mechanisms (e.g., simple CAS-based mutual exclusion spin locks) for memory areas that exhibit false conflicts. In such embodiments, the system may automatically adapt and shift specific stripes from clustering (indirect locks) to more traditional modes if false conflicts prove to be a performance problem. Alternatively, the clustering mechanisms may be used in stand-alone mode as the sole concurrency control mechanism.

Figure 6:
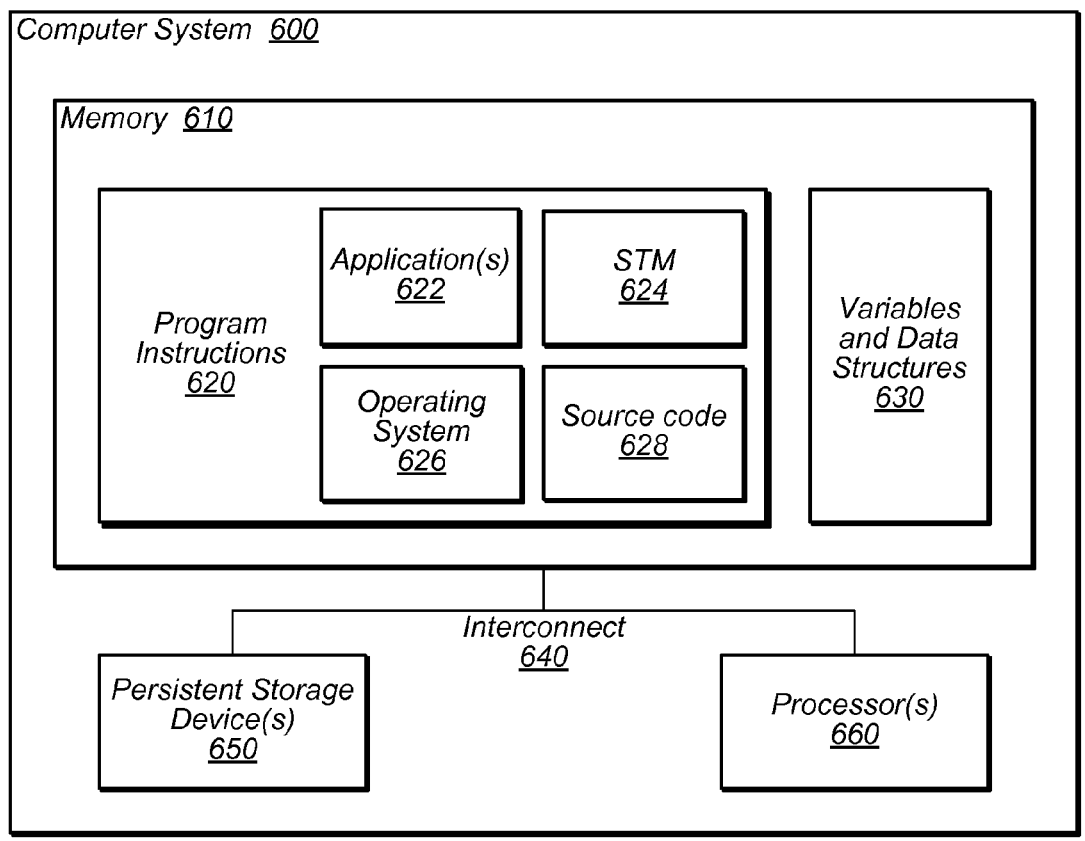
FIG. 6 illustrates a computing system configured to implement the systems and methods described herein, according to some embodiments.

FIG. 6 illustrates a computing system configured to implement the systems and methods described herein, according to various embodiments. The computer system 600 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

The transactional lock clustering mechanisms described herein may be provided as a computer program product, or software, that may include a computer-readable storage medium having stored thereon instructions, which may be used to program a computer system (or other electronic devices) to perform a process according to various embodiments. A computer-readable storage medium may include any mechanism for storing information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.)

Computer system 600 may include one or more processors 660, each of which may include multiple cores, any of which may be single or multi-threaded. The computer system 600 may also include one or more persistent storage devices 650 (e.g. optical storage, magnetic storage, hard drive, tape drive, solid state memory, etc) and one or more memories 610 (e.g., one or more of cache, SRAM, DRAM, RDRAM, EDO RAM, DDR 12 RAM, SDRAM, Rambus RAM, EEPROM, etc.). Various embodiments may include fewer or additional components not illustrated in FIG. 6 (e.g., video cards, audio cards, additional network interfaces, peripheral devices, a network interface such as an ATM interface, an Ethernet interface, a Frame Relay interface, etc.)

The one or more processors 660, the storage device(s) 650, and the system memory 610 may be coupled to the system interconnect 640. One or more of the system memories 610 may contain program instructions 620. Program instructions 620 may include program instructions executable to implement one or more applications 622 (which may be multi-threaded), software transactional memory systems 624, operating systems 626, and/or source code 628 for one or more of applications 622, as described herein. Program instructions 620 may be encoded in platform native binary, any interpreted language such as Java™ byte-code, or in any other language such as C/C++, Java™, etc or in any combination thereof.

The program instructions 620 may include software components and/or mechanisms configured to provide functions, operations and/or other processes for implementing transactional lock clustering mechanisms, as described herein. For example, STM 624 may include functionality to determine groups of memory areas and to associate each group with a respective lock, to dynamically remap memory areas to different locks, to seize locks from other threads, and/or to perform any of the various functionalities described herein. Software components to support such functions may exist in STM 624 and/or in various shared software libraries stored as part of program instructions 620 (not pictured). In some embodiments, applications 622 may comprise one or more multi-threaded applications configured to use STM 624 for concurrency control among multiple concurrent threads.

The system memory 610 may further comprise variables and data structures 630. Variables and data structures 630 may include data used by STM 624, such as locks, lock records, access sets, such as slotted read-write locks, stripe metadata, etc. Stripe metadata may include mappings of stripe identifiers to memory addresses and/or to lock metadata (e.g., instances of slotted read-write locks)

Although the embodiments above have been described in considerable detail, numerous variations and modifications will become apparent to those skilled in the art once the above disclosure is fully appreciated. For example, the lock clustering mechanisms described herein may be used in conjunction with any type of locks, including conventional and/or read/write locks. In some embodiments, different variations of read/write locks may be used, such as SNZI. Alternatively, clustering may be implemented using TL2-style versioned write locks. It is intended that the following claims be interpreted to embrace all such variations and modifications.

What is claimed:

1. A computer-readable storage medium storing program instructions executable by one or more processors to implement:
    determining that a group of shared memory areas are likely to be accessed together in one or more atomic memory transactions executed by one or more threads of a computer program in a transactional memory system;
    in response to said determining, associating the group of memory areas with a single software lock, wherein the software lock is usable by the transactional memory system to coordinate concurrent transactional access to the group of memory areas by the threads of the computer program;
    a thread of the threads acquiring the single software lock; and
    subsequent to said acquiring, the thread accessing one or more of the group of memory areas from within an atomic memory transaction governed by the transactional memory system.

2. The computer-readable storage medium of claim 1, wherein said determining is dependent on an observed dynamic memory access behavior of the one more threads.

3. The computer-readable storage medium of claim 1, wherein said determining is dependent on a static analysis of the computer program.

4. The computer-readable storage medium of claim 1, wherein said determining is dependent on the group of memory areas having been accessed from within a single transaction.

5. The computer-readable storage medium of claim 1, wherein said determining is dependent on the group of memory areas having been accessed from within a transaction initiated from a given location in the computer program.

6. The computer-readable storage medium of claim 1, wherein said determining is dependent on a programmer supplied hint.

7. The computer-readable storage medium of claim 1, wherein each of the memory areas is mapped to a respective lock record, each lock record comprising a forwarding pointer, and wherein said associating comprises modifying a value of the forwarding pointer in one or more of the respective lock records to a value usable to locate the single software lock.

8. The computer-readable storage medium of claim 7, wherein each lock record further comprises a software lock.

9. The computer-readable storage medium of claim 8, wherein the single software lock is chosen from among those contained in the lock records to which the memory areas of the group are already mapped.

10. The computer-readable storage medium of claim 1, wherein the program instructions are further executable to implement:
- detecting that two or more of the threads have attempted to concurrently access a member of the group from within respective transactions; and
- in response to said detecting, disassociating the member of the group from the single software lock.

11. The computer-readable storage medium of claim 1, wherein the single software lock comprises a read/write lock, wherein the read/write lock can be held concurrently by either (a) multiple ones of the threads for read-only access to the group of memory locations or (b) by one of the threads for write access to the group of memory locations.

12. A computer system, comprising:
- one or more processors;
- a memory coupled to the one or more processors and storing program instructions executable by the processors to implement a method comprising:
  - determining that a group of shared memory areas are likely to be accessed together in one or more atomic memory transactions executed by one or more threads of a computer program in a transactional memory system;
  - in response to said determining, associating the group of memory areas with a single software lock, wherein the software lock is usable by the transactional memory system to coordinate concurrent transactional access to the group of memory areas by the threads of the computer program;
  - a thread of the threads acquiring the single software lock; and
  - subsequent to said acquiring, the thread accessing one or more of the group of memory areas from within an atomic memory transaction governed by the transactional memory system.

13. The system of claim 12, wherein said determining is dependent on an observed dynamic memory access behavior of the one more threads.

14. The system of claim 12, wherein said determining is dependent on a static analysis of the computer program.

15. The system of claim 12, wherein said determining is dependent on the group of memory areas having been accessed from within a single transaction.

16. The system of claim 12, wherein each of the memory areas is mapped to a respective lock record, each lock record comprising a forwarding pointer, and wherein said associating comprises modifying a value of the forwarding pointer in one or more of the respective lock records to a value usable to locate the single software lock.

17. The system of claim 16, wherein each lock record further comprises a software lock and wherein the single software lock is chosen from among those contained in the lock records to which the memory areas of the group are already mapped.

18. A computer-implemented method, comprising:
- determining that a group of shared memory areas are likely to be accessed together in one or more atomic memory transactions executed by one or more threads of a computer program in a transactional memory system;
- in response to said determining, associating the group of memory areas with a single software lock, wherein the software lock is usable by the transactional memory system to coordinate concurrent transactional access to the group of memory areas by the threads of the computer program;
- a thread of the threads acquiring the single software lock; and
- subsequent to said acquiring, the thread accessing one or more of the group of memory areas from within an atomic memory transaction governed by the transactional memory system.

19. The computer-implemented method of claim 18, wherein said determining is dependent on an observed dynamic memory access behavior of the one more threads.

20. The computer-implemented method of claim 18, wherein said determining is dependent on a static analysis of the computer program.

* * * * *